United States Patent [19]

Burnell et al.

[11] Patent Number: 5,314,925

[45] Date of Patent: May 24, 1994

[54] USE OF POLYTETRAFLUOROETHYLENE RESINS AS A NUCLEATING AGENT FOR FOAM MOLDED THERMOPLASTICS

[75] Inventors: Ann M. Burnell, Schenectady, N.Y.; Albin P. Berzinis, Lenox; Timothy M. Conroy, Pittsfield, both of Mass.; Kim G. Balfour, Schenectady, N.Y.

[73] Assignee: General Electric Company, Mass.

[21] Appl. No.: 984,782

[22] Filed: Dec. 3, 1992

[51] Int. Cl.$^5$ ............................................. C08J 9/06
[52] U.S. Cl. ........................................ 521/92; 521/138; 521/139; 521/180; 521/182; 521/908; 521/79; 521/81
[58] Field of Search ................ 521/180, 138, 92, 908, 521/182, 139, 79, 81

[56] References Cited

U.S. PATENT DOCUMENTS

| | | | |
|---|---|---|---|
| 3,554,932 | 1/1971 | Overcashier | 260/2.5 |
| 4,107,232 | 8/1978 | Haaf et al. | 260/889 |
| 4,332,714 | 6/1982 | Haaf et al. | 524/141 |
| 4,544,677 | 10/1985 | Allen et al. | 521/91 |
| 4,587,272 | 5/1986 | Avakian et al. | 521/90 |
| 4,683,247 | 7/1987 | Allen et al. | 521/91 |
| 4,771,096 | 9/1988 | Bussink et al. | 524/508 |
| 4,791,145 | 12/1988 | Pressman | 521/79 |
| 4,906,688 | 3/1990 | Fichenauer et al. | 525/67 |
| 4,960,822 | 10/1990 | Eichenauer et al. | 525/67 |
| 4,994,217 | 2/1991 | Banevicius et al. | 264/45.9 |
| 5,089,562 | 2/1992 | van de Meer et al. | 525/132 |
| 5,091,472 | 2/1992 | Brown et al. | 525/92 |
| 5,102,591 | 4/1992 | Hasson et al. | 264/45.9 |

FOREIGN PATENT DOCUMENTS

| | | |
|---|---|---|
| 1432419 | 4/1976 | Canada . |
| 0124958 | 2/1984 | European Pat. Off. . |
| 0386663 | 3/1990 | European Pat. Off. . |
| 1299520 | 12/1972 | United Kingdom . |
| 2070617 | 2/1981 | United Kingdom . |

OTHER PUBLICATIONS

U.S. application Ser. No. 07/743,849, filed Aug. 12, 1991, Hellstern-Burnell et al.
Brochure on Engineering Structural Foam.

Primary Examiner—Morton Foelak

[57] ABSTRACT

A process for producing structural aromatic polycarbonate thermoplastic foam is provided which involves gas expansion of a melted aromatic polycarbonate thermoplastic resin composition containing an amount of a polytetrafluoroethylene nucleating agent. The thermoplastic resin compositions provided exhibit an improved uniformity of cell structure in the resultant structural thermoplastic foam as a result of the incorporation of the polytetrafluoroethylene nucleating agent. The process and compositions are useful in the production of structural thermoplastic foam articles.

11 Claims, No Drawings

USE OF POLYTETRAFLUOROETHYLENE RESINS AS A NUCLEATING AGENT FOR FOAM MOLDED THERMOPLASTICS

BACKGROUND OF THE INVENTION

1. Field of Invention

This invention relates to structural thermoplastic foam, and more particularly relates to the use of polytetrafluroethylene resin as a nucleating agent for foamable thermoplastic resins, injection molding foam processes using the same, and thermoplastic resin compositions useful in the process.

2. Description of the Related Art

The production of thermoplastic structural aromatic polycarbonate foam articles by injection molding processes using either an inert gas such as nitrogen, a chemical blowing agent, or mixtures thereof, are well known in the art. Such processes typically use a thermoplastic resin which contains an amount of a nucleating agent which is added for the purpose of assisting in the formation of cell structures during the foaming process. The use of some nucleating agents such as clay have, however, in some circumstances can show an inability to uniformly expand the thermoplastic resins resulting in non-uniform cell structures and higher density foams than are desired.

Accordingly, there is a need for a nucleating agent which will enhance the uniformity of the cell structures formed upon expansion of the resin.

SUMMARY OF THE INVENTION

The present invention provides a process for producing structural thermoplastic aromatic polycarbonate foam which involves gas expansion of a melted thermoplastic resin composition comprising at least one foamable aromatic polycarbonate thermoplastic resin and an amount of polytetrafluoroethylene nucleating agent. The use of polytetrafluoroethylene nucleating agent provides a structural thermoplastic foam that exhibits improved cell uniformity, lower foam density, and requires lower loadings of nucleating agent than has traditionally been the case for nucleating agents such as clay.

DETAILED DESCRIPTION OF THE INVENTION

The process of the present invention involves gas expansion of a melted thermoplastic resin composition comprising at least one foamable aromatic polycarbonate thermoplastic resin and an amount of a fluoropolyolefin nucleating agent. The nucleating agent is preferably present at a level effective to enhance the cell structure uniformity of the structural foam.

The fluoropolyolefin nucleating agent is preferably in the form of tetrafluoroethylene with fluorine contents of from 65 to 76% by weight, preferably from 70 to 76% by weight. Examples of suitable fluoropolyolefins include polytetrafluoroethylene, tetrafluoroethylene-hexafluoropropylene copolymers, tetrafluoroethylene copolymers containing small quantities of copolymerisable, ethylenically unsaturated monomers which are free from fluorine. These polymers are known. They may be prepared by known processes, for example by the polymerization of tetrafluoroethylene in an aqueous medium with a catalyst which forms free radicals, such as sodium, potassium or ammonium peroxydisulphate at pressures of from 7 to 71 kg/cm² and at temperatures of 0° to 200° C., preferably 20° to 100° C. and for further details see, for example, U.S. Pat. No. 2,393,967 which is incorporated herein by reference. The density of these materials may vary from 1.2 to 2.3 g/cm³ and preferably from 1.2 to 1.9 g/cm³ and the average particle size from 0.05 to 1000 micrometer preferably from 0.05 to 20 micrometer, more preferably from 0.08 to 10 micrometer, more preferably depending on the form in which they are to be used.

Suitable tetrafluroethylene polymers may be used in powder form and may have particle sizes of, for example, from 100 micrometer to 1000 micrometer and densities of from 2.0 g/cm³ to 2.3 g/cm³.

The nucleating agent of the present compositions is most preferably a microfibrillar poly(tetrafluoroethylene) resin. By "microfibrillar", it is meant that the resin forms microfibrils upon being rubbed between the palms of one's hand. Such resins are commercially available or can be prepared by known methods. An example of a commercially available microfibrillar polytetrafluoroethylene resin is TEFLON ® Type 6, sold by the DuPont Company.

Suitable foamable aromatic polycarbonate thermoplastics resins include such thermoplastic resins as aromatic polycarbonate resin, blends of rubber modified vinyl aromatic graft copolymers, preferably acrylonitrile-butadiene-styrene graft copolymers with aromatic polycarbonate resin. The preferred foamable thermoplastic resin is a blend of a polycarbonate resin with a rubber modified vinyl aromatic graft polymer.

Polycarbonate resins, suitable for use in this invention, can comprise non-aromatic as well as aromatic forms. With respect to aromatic polycarbonate resins, these can be made by those skilled in this art or can be obtained from a variety of commercial sources. They may be prepared by reacting a dihydric phenol with a carbonate precursor, such as phosgene, a holoformate or a carbonate ester. Typically, they will have recurring structural units of the formula:

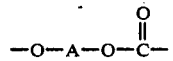

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis-(4-hydroxyphenyl)propane; 2,2-bis-(3,5-dimethyl-4-hydroxyphenyl) propane; 4,4'-di-hydroxydiphenyl ether; bis(2-hydroxyphenyl)methane, mixtures thereof and the like. The preferred aromatic carbonate polymer for component (ii) is a homopolymer derived from 2,2-bis(4-hydroxyphenyl) propane(bisphenol-A).

Poly(ester carbonates) may be used as the aromatic polycarbonate component and are known and can be obtained commercially. Generally, they are copolyesters comprising recurring carbonate groups

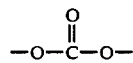

carboxylate groups

and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid, such as phthalic acid, isoptalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units can range from 1:0.30–0.80:0.70–0.20 and the molar range of terephthalate units to isophthalate units can range from 9:1 to 2:8 in this preferred family of resins.

The rubber modified vinyl aromatic graft copolymers are preferably prepared from 5–90 parts by weight, preferably from 30–80 parts by weight of vinyl aromatic monomers grafted onto a rubber substrate wherein the vinyl aromatic monomer is selected from the group consisting of styrene, alpha-methylstyrene, styrene substituted in the nucleus. A portion of the vinyl aromatic monomer amount may be be replaced by monomers selected from the group consisting of methylmethacrylate, acylonitrile, methacrylonitrile, maleic acid anhydride, N-substituted maleimide, vinyl acetate or mixtures thereof. The rubber component is preferably present at a level percent 95–10 parts by weight based on the total weight of the graft polymer, preferably from 70–20 percent by weight thereof of a rubber having a glass temperature $\leq 10°$ C.

Rubbers suitable as grafting bases for the preparation of the graft polymers include in particular polybutadiene, butadiene/styrene copolymers, butadiene/acrylonitrile copolymers, polyisoprene, EPM rubbers (ethylene/propylene rubbers), EPDM rubbers (ethylene/propylene/diene rubbers containing, as diene, a nonconjugated diene such as hexadiene-(1,5) or norbornadiene in small quantities) and alkylacrylate rubbers based on $C_1$–$C_8$ alkyacrylates, in particular ethyl, butyl and ethylhexylacrylate.

The alkylacrylate rubbers may contain up to 30% by weight (based on the weight of rubber) of monomers such as vinyl acetate, acrylonitrile, styrene, methylmethacrylate and/or vinyl ether as copolymer components. The alkylacrylate rubbers may also contain minor quantities, preferably up to 5% by weight (based on the weight of rubber) of ethylenically unsaturated monomers which have a cross-linking action. Examples of such crosslinking agents include alkylenedioldiacrylates and -methacrylates, polyester-diacrylates and -methacrylates, divinylbenzene, trivinylbenzene, triallylcyanurate, allylacrylate, alkylmethacrylates, butadiene and isoprene. Acrylate rubbers used as graft basis may also be core-shell products containing, as core, a crosslinked diene rubber of one or more conjugated dienes such as polybutadiene or a copolymer of conjugated diene with an ethylenically unsaturated monomer such as styrene and/or acrylonitrile.

Diene rubbers and alkyl acrylate rubbers are preferred rubbers for the preparation of the graft polymers.

The rubbers are present in graft polymer in the form of at least partially cross-linked particles having an average particle diameter of from 0.05 to 20.0 micrometer, preferably from 0.1 to 2.0 micrometer and most preferably from 0.1 to 0.8 micrometer. The term particle diameter used in this context always denotes the average particle diameter $d_{50}$ determined by ultracentrifuge measurements according to W. Scholtan et al, Kolloid-Z, u-Z. Polymere 250 (1972), 782–796.

The graft polymers are prepared by radical graft polymerization of the monomers in the presence of the rubbers which are to be grafted.

The preferred methods of preparation of the graft polymers are emulsion, solution, solvent-free and suspension polymerisation and combinations of these methods carried out in known manner. ABS polymers are particularly preferred graft polymers.

Injection molding processes for producing thermoplastic structural foam may be achieved by either introducing an inert gas directly into the melted thermoplastic composition or by preblending the thermoplastic resin with a chemical blowing agent which, when heated during processing, releases inert gas that disburses through the polymer melt. When the gas/resin mixture is shot under pressure into the mold cavity, the gas expands within the plasticized material as it fills a mold, producing an internal cellular structure as well as a tough external skin at the mold surface. Large part molding capabilities of the injection molding structural foam process can be achieved at low mold pressures by the self expanding character of the plasticized material.

Structural foam molding processes involve combining molten thermoplastic with a blowing agent in the melt, which is stored under pressure and is injected into the mold cavity for expansion of the compressed gases within the polymer melt creates the cellular structures and maintains internal pressure on the external skin during cooling and reducing sink marks. There are different types of foam processing methods which are identified as high pressure and low pressure processes. Low pressure processes employ both a physical blowing agent, most commonly nitrogen and chemical blowing agents, while high pressure processes generally employ only chemical blowing agents.

In low pressure processing methods for structural foam, a metered volume of plastic resin with blowing agent, which is less than the volume of the mold cavity, is injected into the mold. At this point, the gas polymer mixture expands and fills the mold cavity. The portion of this mass that contacts the mold surface forms a skin layer while the interior of the mass forms a cellular core. Since the mold cavity is not completely filled during injection, the high pressures of injection cannot be transmitted into the mold, and the average cavity pressure is typically under 500 pounds per square inch (PSI).

The low pressure results in parts with very low molded in stresses and this in turn results in virtual elimination of warp. These factors contribute to the success of low pressure processes in the molding of large intricate parts.

Low pressure processing with nitrogen or other inert gases can be achieved by using an extruder which mixes and then meters the gas containing polymer melt into a holding container called an accumulator where the melt is held under pressure to prevent premature expansion. When the predetermined shot size attained in the accumulator, a valve opens and a plunger forces the melt into the mold, only partially filling it. The thermoplastic resin melt is then expanded in the mold cavity by the compressed gases.

Low pressure processing with chemical blowing agents is achieved by mixing the blowing agents with the plastic pellets or plastic particles and then introducing the mixture into the molding machine. During processing the blowing agent is exposed to sufficient heat to cause it to decompose thus giving off the gases necessary to achieve the foaming process. Chemical blowing agents typically decompose within narrow temperature ranges which must be matched to the processing temperatures of the resin for which they are to be used. The equipment used for low pressure structural foaming processes with chemical blowing agents is very similar to that used for injection molding processes using nitrogen gases. High pressure structural foaming processes are characterized not only by the high cavity pressures employed, typically 2,000 to 20,000 PSI, but also by the volume of material injected into the mold in the system, sufficient material to completely fill the mold is injected under injection molding pressures. The mold cavity volume is then increased by controlled opening of the platens, core or slide activators, or by combination of these actions to allow the foaming actions to occur. These foaming processes are all well known in the art.

The thermoplastic resin compositions of the present invention comprise a foamable thermoplastic aromatic polycarbonate resin and a fluoropolyolefin nucleating agent present in an amount effective to enhance the uniformity of the cell structures formed during expansion of the thermoplastic composition during injection molding foaming processes. Preferably the nucleating agent is present at a level of from 0.01 to 1% by weight based on the total weight of said thermoplastic resin composition, more preferably at a level of from 0.01 to 0.1% by weight thereof, even more preferably present at a level of 0.01 to 0.08% by weight thereof, and most preferably present at a level of 0.05 to 0.075% by weight thereof.

The thermoplastic resin composition may also contained at least one plasticizer and/or flame retardant. Such organic phosphates, organic diphosphates, organic polyphosphates, and halogen containing organic compounds such as brominated organic compounds. The composition may contain from 0.5% to 4.0% by weight pigments, such as titanium dioxide, based on the total weight of the composition.

Preferably the polytetrafluoroethylene nucleating agent is incorporated into the composition by first precompounding the nucleating agent with an amount of at least one thermoplastic resin to form a concentrate comprising from 5 to 50 percent by weight polytetrafluoroethylene based on the total weight of the concentrate, and then compounding the concentrate with the remaining thermoplastic resins to make the final composition.

A preferred composition comprises aromatic polycarbonate resin present at a level of from 50% to 100% by weight based on the total weight of the thermoplastic resin composition more preferably from 60% to 80% by weight thereof, and most preferably from 65% to 75% by weight thereof, and further preferably contains a rubber modified vinyl aromatic graft copolymer present at a level of from 0% to 50% by weight based on the total weight of thermoplastic resin composition more preferably from 20% to 40% by weight thereof, and most preferably from 25% to 35% by weight thereof and further contains the polytetrafluoroethylene nucleating agent present at a level of from 0.01 to 1 percent by weight based on the total weight of the thermoplastic resin composition, more preferably from 0.01 to 0.1 percent by weight thereof, even more preferably 0.01 to 0.08 percent by weight thereof, and most preferably from 0.05 to 0.075 percent by weight thereof.

The thermoplastic compositions may contain amounts of fillers, for example glass fibers, glass beads, mica, carbon fibers, talc, calcium carbonate, metal flakes, metal fibers. The thermoplastic composition may be either plasticized or nonplasticized.

As mentioned above, prior injection molding foaming processes involving thermoplastic materials containing traditional nucleating agents such as clay at 0.5 parts per weight have provided problems with respect to inability to uniformly expand the thermoplastic material and foam injection molding processes.

We have found that the addition of polytetrafluoroethylene to thermoplastic compositions of aromatic polycarbonate resin and to thermoplastic compositions of blends of aromatic polycarbonate resin and a acrylonitrile butadiene-styrene graft copolymer which are then foam injection molded results in the polytetrafluoroethylene acting as a nucleating agent to generate cells which grow to produce the final foam structure during the injection molding process leading to better structural foam cell uniformity. Also as mentioned above, traditional nucleating agents are typically used at 0.5 to 1 parts by weight based on the total weight of the composition, whereas the polytetrafluoroethylene nucleating agents of the present invention function effectively as nucleating agents at levels below 0.1% by weight based on the total weight of thermoplastic composition, for example 0.07% by weight thereof.

EXAMPLES

Table 1 illustrates the improved cell uniformity obtained by using the polytetrafluoroethylene nucleating agents.

The following examples illustrate the effectiveness of the polytetrafluoroethylene nucleating agent to form more uniform cell structures.

Lexan ® aromatic polycarbonate resin (polymerization product of phosgene and bisphenol-A) and Cycoloy ® resin (blend of an aromatic polycarbonate resin and an acrylonitrile-butadiene-styrene graft copolymer (ABS)) were foam injection molded using 6% of a chemical blowing agent to attain a 20% weight reduction (Table 1). The addition of 0.02 percent by weight polytetrafluoroethylene (PTFE) to the thermoplastic resin improves the cell structure uniformity of the foamed article relative to that of foamed articles from neat thermoplastic resin foamed. The additional PTFE and blowing agent were mixed with the thermoplastic resin pellets and injection molded at barrel temperatures set at 540° F. and mold temperature of 100° F. The Lexan ® aromatic polycarbonate resin thermoplastic resin corresponded to the grade Lexan ® ML6000 resin supplied by General Electric Company, and Cycoloy ® resin grade was C2950 supplied by General Electric Company. Both materials are flame retarded. Lexan ML6000 resin contains a brominated flame retardant and Cycoloy ® C2950 resin is flame retarded with an aryl diphosphate. The chemical blowing agent is a chemical blowing agent concentrate containing 3,6dihydro-5-phenyl-2H-1,3,4-oxadiazin-2-one. The chemical blowing agent will decompose at molding temperatures (>200° C.) producing nitrogen, carbon dioxide and other decomposition gases that form the individual cells in molded parts.

For Table 1, the resins representative of polycarbonate and polycarbonate/ABS were foamed with and without PTFE as the nucleating agent. PTFE added to the Lexan® 121 aromatic polycarbonate (PC) resin and Cycoloy® PC/ABS weight blend resin. The PTFE was were added to the resin as a 20% concentrate in polycarbonate, the polytetrafluoroethylene (PTFE) was supplied by DuPont. The blowing agent was 3,6 dihydro-5-phenyl-2H-1,3,4-oxadiaziv-2-one, supplied by G.E. in a concentrated form as FNC95. Optical micro graphs illustrated the improved cell structure in terms of size, uniformity and distribution. The specimens were fractured cryogenically, and optical micro graphs were taken of the fracture surface at a magnification of 8×. The improved cell structure of Lexan® 121 aromatic polycarbonate resin foamed using PTFE as a nucleating agent causes the material to turn opaque instead of transparent as observed with non-nucleated material.

TABLE 1

| Cell Uniformity of Foamed Resin | | | | |
|---|---|---|---|---|
| | PC | PC | PC/ABS | PC/ABS |
| Density | 20% | 20% | 20% | 20% |
| Reduction PTFE | 0 | .02 | 0 | .02 |
| IZOD | 31.9 | 22.4 | 18.3 | 14.5 |
| s.d. | 6.1 | 6.7 | 3.6 | 5.2 |
| Uniformity of Cell Structure | poor | good | poor | good |

The foamed articles of Table 1 were examined by optical microscopy after foaming to determine the effect that Teflon® PTFE nucleating agent had on cell structure when it is added to the blend.

A marked improvement can be seen in the foamed samples made with Teflon® PTFE as the nucleating agent where a smaller and tighter cell structure can be seen.

Optical microscopy samples were prepared by freeze fracture and were observed by optical methods.

What is claimed is:

1. A process for producing structural aromatic polycarbonate thermoplastic foam articles, said process comprising: gas expansion of a melted aromatic polycarbonate thermoplastic resin composition comprising at least one foamable aromatic polycarbonate thermoplastic resin and an amount of a microfibrillar polytetrafluoroethylene nucleating agent effective to enhance the cell structure uniformity of the structural foam.

2. The process of claim 1 wherein said polytetrafluoroethylene nucleating agent is present at a level of from 0.01 to 0.08 percent by weight based on the total weight of the composition.

3. The process of claim 1 wherein said foamable thermoplastic resin is a mixture of aromatic polycarbonate polymer and a rubber modified vinyl aromatic graft copolymer.

4. A process for producing structural thermoplastic foam, said process comprising: gas expansion of a melt thermoplastic resin composition comprising an aromatic polycarbonate resin, a rubber modified vinyl aromatic graft copolymer and an amount of a microfibrillar polytetrafluoroethylene nucleating agent effective to improve the cell structure uniformity of the resultant structural foam.

5. The process of claim 1 wherein said thermoplastic resin consists essentially of said aromatic polycarbonate resin, said rubber modified vinyl aromatic graft copolymer and said polytetrafluoroethylene nucleating agent.

6. The process of claim 1 wherein said aromatic polycarbonate resin is present at a level of from 60 to 80 percent by weight based on the total weight of the thermoplastic resin composition, said rubber modified vinyl aromatic graft copolymer is present at a level of from 20 to 40 percent by weight based on the total weight of the thermoplastic resin composition, and said polytetrafluoroethylene nucleating agent is present at a level of from 0.01 to 0.08 percent by weight based on the total weight of said thermoplastic resin composition.

7. The process of claim 2 wherein said resin composition further contains a plasticizer.

8. The process of claim 1 wherein said composition is formed by precompounding said nucleating agent with the amount of thermoplastic resin to form a concentrate comprising from 5 to 50 percent by weight polytetrafluoroethylene based on the total weight of the concentrate, and then compounding said concentrate with the remainder of said thermoplastic resin to make said composition.

9. The process of claim 1 wherein said composition further comprises from 0.5% to 4% by weight titanium dioxide based on the total weight of the composition.

10. The process of claim 1 wherein said gas expansion is achieved by thermal decomposition of a chemical blowing agent present in said composition.

11. The process of claim 2 wherein the resin composition further contains a flame retardant.

* * * * *